Jan. 19, 1960 G. A. HATHERELL ET AL 2,921,736

PHOTOELECTRIC READER FOR PUNCHED CARDS

Filed Sept. 6, 1955 2 Sheets-Sheet 1

INVENTOR.
GEORGE A. HATHERELL
KENNETH R. CARLISLE
BY Juliwider Mattingly & Huntley
ATTORNEYS Jan. 19, 1960 G. A. HATHERELL ET AL 2,921,736

PHOTOELECTRIC READER FOR PUNCHED CARDS

Filed Sept. 6, 1955 2 Sheets-Sheet 2

INVENTOR.
GEORGE A. HATHERELL
KENNETH R. CARLISLE
BY
ATTORNEYS

United States Patent Office 2,921,736
Patented Jan. 19, 1960

2,921,736

PHOTOELECTRIC READER FOR PUNCHED CARDS

George A. Hatherell, Sun Valley, and Kenneth R. Carlisle, Torrance, Calif., assignors, by mesne assignments, to The National Cash Register Company, Dayton, Ohio, a corporation of Maryland Application September 6, 1955, Serial No. 532,624
13 Claims. (Cl. 235—61.11)

This invention relates generally to card readers used for collecting information recorded on punched cards by means of the holes therein, and for transmitting said information in the form of electrical impulses to some other device, such as a computer or an electric typewriter.

More particularly, this invention relates to a high-speed card reader in which cards are passed before a photoelectric reading head by means of a roll (or other moving conveyor) with which the cards are engaged by means of suction applied at the region of contact between roll and card. Preferably, the card reader includes a timing device in synchronism with said roll, said timing device being used to identify in the card reader output the point along said card at which each output signal originates, and/or to sound an alarm and interrupt operation of the card reader whenever a card is not presented correctly to the reading head.

The development of electronic digital computers has provided science and industry with an extremely useful and versatile tool for carrying out long computations and for automatically controlling complex or high-speed operations. However, these machines are capable of processing data only after they have been supplied with an input of information from a suitable source of instruction and control. Although magnetic tape and drum inputs are used, and even voice input has been proposed, the most commonly used type of information record for practical data processing machines at the present time is the punched card, such as the cards employed in the machines manufactured by the International Business Machines Corp. The IBM cards are made of thin but relatively stiff paper in a size about 7⅜ inches long by 3¼ inches wide; the space on each card is allocated into eighty columns longitudinally, and twelve rows transversely. Usually, one side of the card, which may be referred to as its face, is imprinted with digits to identify each longitudinal and transverse location, and with legends setting forth their significance. The information contained in a card is indicated by the presence or absence of a punched hole for each row-and-column location. Each such IBM card contains an amount of information known in computer card terminology as 960 bits. Ordinarily, the information required for a data processing operation may be extracted by reading the information recorded on several hundred or several thousand of such cards.

At the present time, a device known as a card reader receives a stack of input cards in an input magazine and then feeds the cards one at a time in a direction transverse to their length, past a row of eighty small brushes which detect the presence of a hole and cause the passage of an electric current. Each card progresses through the reader in twelve intermittent movements, one for each row of holes. The electrical impulses thus produced by the card reader indicate the column from which they were derived by the line in which they are received, and the row by their time phasing. In some cases it is possible for the computer to accept and use information directly from the card reader, but usually the rate and order in which it requires its input information differs from the rate and order at which the card reader transmits information picked up from the cards. It is therefore ordinarily necessary to interpose some intermediate storage device, such as a buffer register. Such devices, well known to those familiar with the art of electronic digital computers, store the information received from a card reader in some type of magnetic or electronic memory system from which it may be extracted as required by the computer.

Improvements in electronic computers in recent years have resulted in great advances in their speed, capacity and versatility, but with these advances have gone advancing demands for means for introducing huge quantities of input information into the computer at a very high rate of speed. The ordinary brush type card reader usually operates at a speed of about one hundred cards per minute. In special applications, speeds as high as two or three hundred cards per minute may be achieved, but it is generally believed that it is impractical to read cards by the brush method at a higher rate than three hundred cards per minute. This is far from adequate for the input requirements of many existing computers, and imposes a limitation on advancements in computer design.

It is a major object of the present invention to provide a card reader capable of operating at speeds in the range of two thousand cards per minute. In connection with the achievement of this object, it has been necessary to devise means for handling punched cards at a high speed and with precision in removing one card at a time from an incoming stack, passing it at high velocity past a reading head, and restacking it in an orderly manner in an outgoing stack.

A photo-electric reading head is employed for detecting the presence or absence of holes in each location on the card. Such photo-electric reading means have been proposed in the past, but it has not yet been possible to overcome the difficulties of carrying out photo-electric reading at a high velocity of card movement. The present invention overcomes these difficulties by means of a novel method of card handling and a timing device synchronized with a card conveying means and utilized to control the output from the reading head.

Card handling is accomplished by a system of card conveying rolls in which the card is held against the surface of the roll during its passage by means of suction applied at the region of contact between card and roll. Previously known devices have sometimes employed suction to pick up or transport cards or paper, over a drum or roll, but ordinarily, the suction has been applied to the entire surface of the drum or roll by continuously exhausting air from the interior of the roll. In many cases, the suction is only required over that portion of the surface of the conveying roll or drum which is momentarily in contact with a card in the process of transportation; nevertheless, sufficient vacuum must be applied in most known systems to exhaust air entering from ports over the entire surface of the conveying roll. This weakens the suction at the card, where it was most required, and increases the volume of air which it is necessary to move, and the size and cost of equipment for applying the vacuum. Furthermore, the movement of air past the ports in the surface moving at high speed often generates a siren-like scream, making the device extremely noisy and unpleasant to operate.

In the transportation of punched cards at high speed, a problem of decelerating cards to a stop after reading, and neatly restacking them is encountered. It is therefore an object of the present invention to provide a braking means for rapidly decelerating and suddenly stopping each card as it is expelled from the high-speed card reading device.

High-speed transportation of cards past the reading head practically precludes any intermittent movement by means of which successive rows or columns of holes may be inspected and read. It is therefore an additional object of the present invention to provide means for timing the instant at which each column of holes passes the reading head. In the present invention cards are fed past the reading head longitudinally rather than transversely as in the usual card reading device. In the specific embodiment herein illustrated, a timing disc rotating in synchronism with the feeding roller issues timing pulses which, together with the passage of the card itself, control the intervals at which output from the card reader is transmitted.

There is always a danger in high-speed card reading devices that a slight malfunctioning of the card transporting mechanism, or any defect in a card, such as a fold or tear, or the feeding of cards in an improper or overlapping manner, may cause misreading at the reading head, or entanglement of the cards in the process of transport. It is therefore a further object of the present invention to provide automatic means for setting an alarm and for shutting off both card reader and computer in case of any of the foregoing emergencies. In the specific embodiment herein illustrated, this is accomplished in connection with the same timing and counting mechanism employed for controlling the output of the card readers.

Other objects and features of the invention will be apparent from the following description. In the accompanying drawings.

Figure 1:
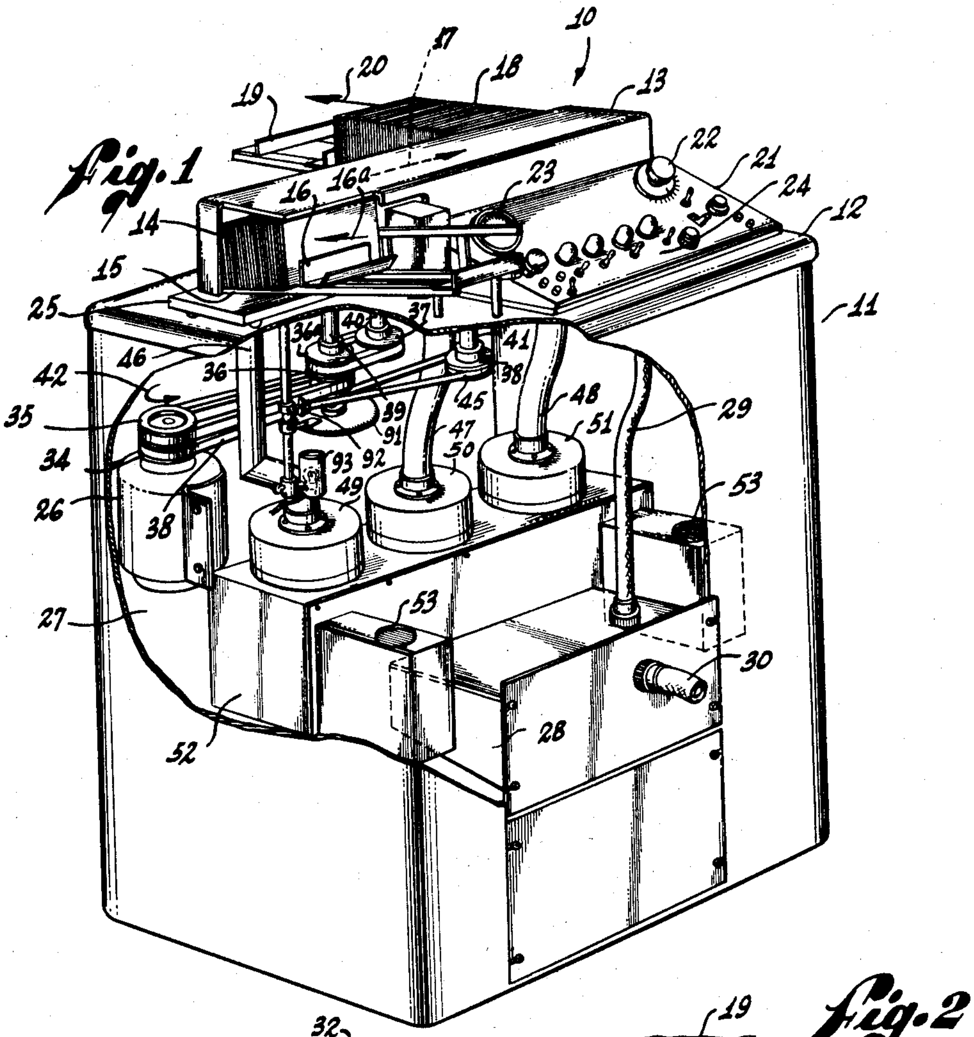
Figure 1 is a perspective view of the card reader with one corner of the cabinet broken away to reveal the electronic and mechanical parts housed therein.

In Figure 1, the arrow 10 indicates the card reader generally. A table height cabinet 11 supports on its top 12 card transporting and reading apparatus under a feeder housing 13 which is removable for servicing.

An ingoing stack of cards 14 is supported in an obliquely tilted magazine 15 from which cards are fed to the reader in the direction of the arrow **16*a* by the downward pressure of pusher 16. The cards are transported one by one through the card reader under housing 13 in the direction of arrow 17 and restacked in the same order in outgoing stack 18, which gradually fills magazine 19 as the stack progresses in the direction of the arrow 20. A control panel 21 is equipped with a speed control 22 and a tachometer speed reading device 23. Various switches, indicated generally by the numeral 24, control starting and shutdown of the card reader. Preferably, vibration of the apparatus is minimized by mounting the moving parts in a heavy steel plate 25 which is shock mounted on the cabinet top 12**.

The foreground corner of cabinet 11 is broken away to reveal, in its interior, an electric motor 26 for driving card conveying and timing mechanism (to be described hereinafter), a suction system, indicated generally by the numeral 27, for aiding in card handling; and an electronic chassis 28, which houses the electronic equipment for timing the intervals of card reading and for detecting improper operation of the card reader. Motor 26, suction system 27, and electronic equipment 28 are connected to a power supply (not shown) and to a control panel 21 by means of electrical conduits within cabinet 11. The disposition of such conduits within the cabinet is optional and well within the grasp of the skill of the average electrician; hence, none are shown except conduit 29 between control panel 21 and electronic chassis 28. The output of card reader 10 is transmitted to a computer or suitable buffer register in the form of electrical impulses dispatched via output line 30.

Figure 2:
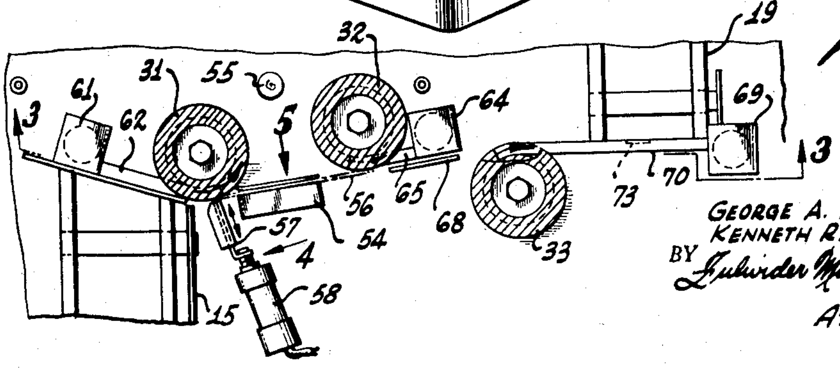
Figure 2 is a plan view of a part of the top of the card reader, with the feeder housing moved to reveal the card transporting mechanism, and the reading head.
Figure 3:
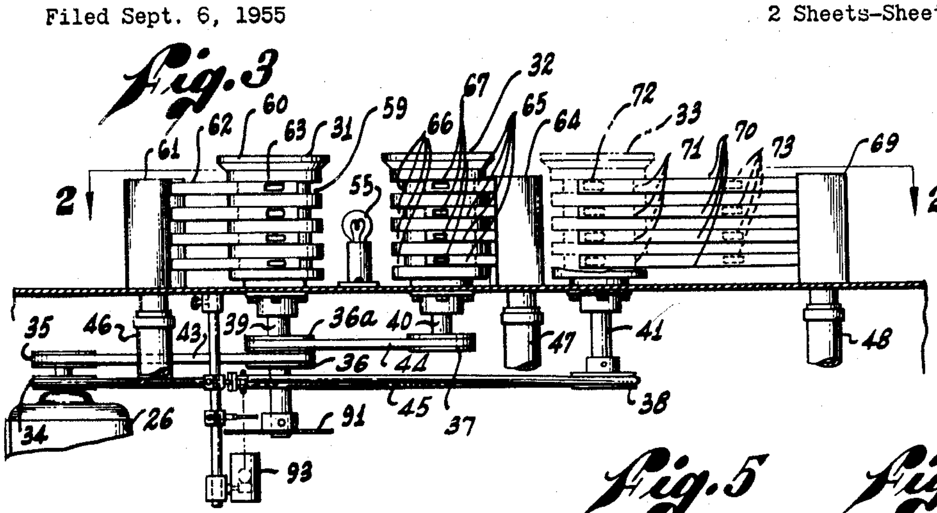
Figure 3 is a vertical sectional view taken along the line 3—3 in Figure 2, as viewed in the direction of the arrows, showing portions of the driving and timing mechanism.

As seen in the plan view of Figure 2 and the elevational view of Figure 3, the cards are transported through the reader, one at a time, by means of a series of three rolls, which may be designated as a feeding roll 31, a passing roll 32, and a stacking roll 33. These rolls are all driven by a motor 26 by means of a belt and pulley arrangement, in which two pulleys 34 and 35 on the upper end of the shaft of motor 26 drive rolls 31, 32, and 33 by means of their pulleys 36, **36*a*, 37, and 38, which are mounted on their respective roll shafts 39, 40, and 41**.

Motor 26 rotates in a counterclockwise direction as indicated by the arrow 42, and is belted by means of a notched V-belt 43 to pulley 36 on the shaft 39 of the feeding roll 31. Pulley **36*a*, also mounted on shaft 39, drives pulley 37 on shaft 40 of passing roll 32 by means of a notched V-belt 44, which insures that rolls 31 and 32** rotate in precise synchronism. Any relative slippage between these two rolls would result in jamming of cards passing the reading head or in an error signal from a monitor timing device to be described hereinafter.

As seen in Figure 2, feeding roll 31 and passing roll 32 are driven in the same direction as the rotation of motor 26, i.e., in a counterclockwise direction. Since, as will be hereinafter shown, stacking roller 33 contacts the transported cards on the opposite face, it is necessary that this roller rotate in a clockwise direction. Motor pulley 34 therefore drives pulley 38 on the shaft 41 of the stacking roll 33 by means of a round belt 45 which is disposed with its loops crossed so as to reverse the direction of rotation at the driven pulley 38. A round belt is suitable for this purpose since some slippage of the stacking roll 33 relative to the other two rolls can be tolerated.

Each of the three pulleys is provided with a suction holder, to be described hereinafter, in which suction is established by exhausting air through exhaust lines 46, 47, and 48 by means of individual vacuum pumps 49, 50, and 51. The air from the vacuum pumps is passed through an exhaust air manifold 52 and out through ports 53 within cabinet 11 so as to cool electronic equipment in electronic chassis 28.

Figure 2 reveals in plan the photo-electric reading head 54, a light 55 for illuminating it, and a masking plate 56 for controlling the illumination to reading head 54.

Cards may be fed continuously past rolls 31, 32, and 33 or may be admitted one at a time at any desired rate by reciprocating card gate 57, which is controlled by means of a solenoid 58.

As previously mentioned, each of the rolls 31, 32, and 33 is provided with a suction holder to engage a card undergoing transportation at a desired region of tangency to the roll surface. As seen in Figure 3, the cylindrical surface of each roll has been machined to produce a plurality of annular grooves 59 of rectangular cross section. Four such grooves for each roll are employed in the present embodiment. Preferably, each roll is also formed with an annular shoulder 60 at its upper end to confine the stream of cards to the desired horizontal movement.

To the left of feeding roll 31 a vertical suction manifold 61, preferably of rectangular cross-section, is connected to exhaust line 46. Projecting horizontally from the right side of suction manifold 61, four suction holders 62, conduits of rectangular cross-section, extend from suction manifold 61 into the annular grooves 59 of feeding roll 31. There is sufficient clearance between the stationary suction holders 62 and the moving walls of grooves 59 to permit feeding roll 31 to rotate freely. Each of the suction holders 62 terminates at its unsupported end in annular groove 59 at a point adjacent that area in which it is desired to engage a passing card with the rotating surface of roll 31. Near the unsupported end of each suction holder 62, a suction orifice 63 is located very near or just behind the card engaging surface of the ridges between grooves 59.

To the right of passing roll 32 a vertical rectangular suction manifold 64, similar to manifold 61, communicates with exhaust line 47. Four suction holders 65 extend to the left of rectangular suction manifold 64 so that their unsupported ends are positioned within annular grooves 66 in the surface of passing roll 32. A suction orifice 67 located in the unsupported end of each of the suction holders 65 serves to pull a passing card into engagement at the desired region of tangency with feeding roll 32.

Cards moving past passing roll 32 are confined to a vertical position immediately adjacent the feeding roll by means of a plate 68 as seen in plan view in Figure 2.

The suction holding arrangement for stacking roll 33 is somewhat different in design and differently positioned than that employed in connection with feeding roll 31 and passing roll 32. Since the stacking roll 33 contacts the face rather than the back of passing cards, and consequently rotates in a counterclockwise direction, suction must be applied at the back of stacking roll 33 as viewed in Figure 3. A rectangular suction manifold 69 located to the right of stacking roll 33 communicates with exhaust line 48. Extending horizontally to the left of suction manifold 69 are four suction holders 70 which also serve a braking function as will be hereinafter described.

As in the case of the feeding roll 31 and the passing roll 32, the cylindrical surface of stacking roll 33 is machined to produce alternate annular ridges and grooves of rectangular cross-section. Suction holders 70 are supported with their free ends nesting in the annular grooves 71, though with sufficient clearance to permit free rotation of stacking roll 33. Suction orifices 72 in the unsupported end of suction holders 70 are disposed, as in the case of the two rolls upstream from it, with the openings immediately adjacent the surface ridges of the roll so as to engage the card along the desired tangential region.

The plan view of Figure 2 reveals that the cards actually wrap around each roll for few degrees of arc, in order to make sure of good contact. For the reason, the rolls are not arranged in a straight line and the suction holders are curved at their orifice ends to apply suction over the entire region in which it is desired for the transported card to be in contact with the moving surface of the roll.

In handling cards moving at the high speeds required in card reading devices of the type disclosed herein, it is necessary to provide some braking means for bringing the cards to a stop at a desired point without damaging or buckling them, or introducing disorder into the output stack. For this purpose, each of suction holders 70 is provided with a braking orifice 73, located near the terminal end of the path of travel of the stream of cards passing through the card reader 10. When a card moving at high velocity approaches the braking hole 73, it is engaged tightly against the stationary surface of suction holders 70. However, since the horizontal distance between orifices 72 and 73 is less than one card length, the card at first experiences a simultaneous braking force at its downstream end and an advancing force from the stacking roll 33 at its upstream end. The engaging force of suction holder 70 is at a minimum, however, when the end of the card only partly covers or barely covers a suction orifice. Consequently, as the card moves past suction orifices 72 and 73, it experiences a steadily increasing braking force, and a steadily diminishing advancing force. As it approaches the end of its path, the upstream end of the advancing card tends to spring away from suction orifices 72 since it is slightly wrapped around an arc of stacking roll 33. At the same time, the downstream end of the card overlaps the braking orifice 73 by a substantial margin so that the card experiences the full braking force of frictional engagement with the stationary surfaces of suction holder 70.

Figure 4:
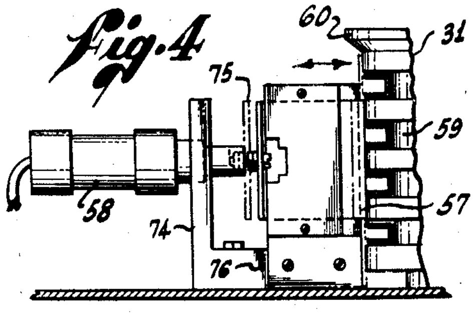
Figure 4 is a front elevational view of the card gate as viewed in the direction of arrow 4 in Figure 2.

Figure 4 illustrates the operation of solenoid operated card gate 57. The solenoid 58 is supported in a rigid mount 74, and gate 57 slides between the closed position shown and an open position indicated by the dashed line 75 in a machined track 76.

Figure 5:
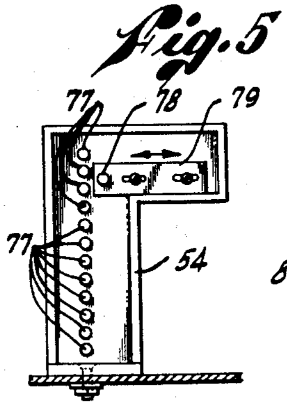
Figure 5 is a front elevational view of the photoelectric reading head as viewed in the direction of the arrow 5 in Figure 2.

Figure 5 illustrates the reading head 54. Since this head is designed for use with an International Business Machine card, it is provided with twelve reading photocells 77 disposed in a vertical column to intercept the twelve rows of the card, one column at a time, as the card moves longitudinally downstream past reading head 54.

A thirtheenth photocell 78 is supported in an adjustable mounting 79, a fraction of an inch downstream from the location of the column of reading photocells 77. Photocell 78 may be designated as the monitoring photocell, since it cooperates with an electronic counter to be described hereinafter for the purpose of detecting improperly read cards or errors in the card feeding operation.

Figure 6:
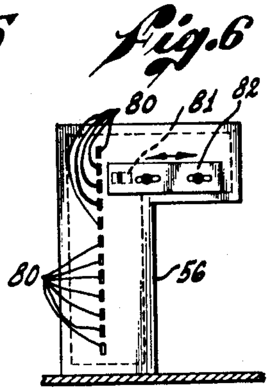
Figure 6 is a front elevational view taken in the same direction as Figure 5 but showing the masking plate in position in front of the reading photo cells.

In Figure 6 the masking plate 56 is shown in elevational view and reveals twelve small slits 80 located to correspond with the rectangular punching in each column of an IBM card. A monitor slit 81 is provided in a monitor masking plate 82, which is adjustable horizontally in the same manner as adjustable photocell mounting 79.

In addition to the mechanism thus far described, the card reader 10 is equipped with a new and novel timing and control system which will be described in connection with Figure 7, and which incorporates certain basic elements, such as amplifiers, flip-flops, drivers, and gates, etc., the operation of which is understood by those familiar with the art of computing machines. The flip-flops just mentioned may be defined as constituting bistable state devices, preferably comprising electronic circuits each provided with two inputs and two corresponding outputs. Well-known forms of such a device are slightly modified types of Eccles-Jordan trigger circuits, having a pair of input terminals and a pair of output terminals, one of each pair being designated as "on" or "true" and the other as "off" or "false."

The nature of the flip-flop circuit is such that a negative-going pulse applied to a given input terminal produces a steady-state high positive voltage at the corresponding output terminal and a low or zero voltage at the other output terminal. These output voltages will remain constant until a negative going pulse is applied to the other input terminal, at which time the conditions reverse and high positive output voltage appears on the alternate output terminal. Since it is the higher positive potential that is used to operate the various control components, signals representing the true condition of the flip-flop are taken from whichever output terminal corresponds to the conditions which it is desired to indicate.

A driver comprises a form of direct current amplifier, including a preliminary amplifier, a "true" power amplifier, and a "false" power amplifier. A single input terminal connects to the pre-amplifier which is so biased as to respond only to the application of a continuing input signal. As long as, and only so long as the driver continues to receive the input signal, its "true" amplifier produces an output, while the "false" amplifier falls to a low or zero voltage output. The instant the input signal stops, conditions reverse at the output terminals of the "true" and "false" amplifiers.

It will be seen that whereas the output of a driver follows the input signal (directly on the "true" output, oppositely on the "false" output), a flip-flop acts as a toggle device, being set to one condition by one pulse, and remaining in that condition regardless of the presence or absence of the input signal thereafter, until it is triggered to the opposite condition by a second pulse on the other of its pair of input terminals.

Various gating networks used in this apparatus, and comprised of interconnected germanium diodes and resistances are arranged in a manner well known to those skilled in the computer art.

Figure 7:
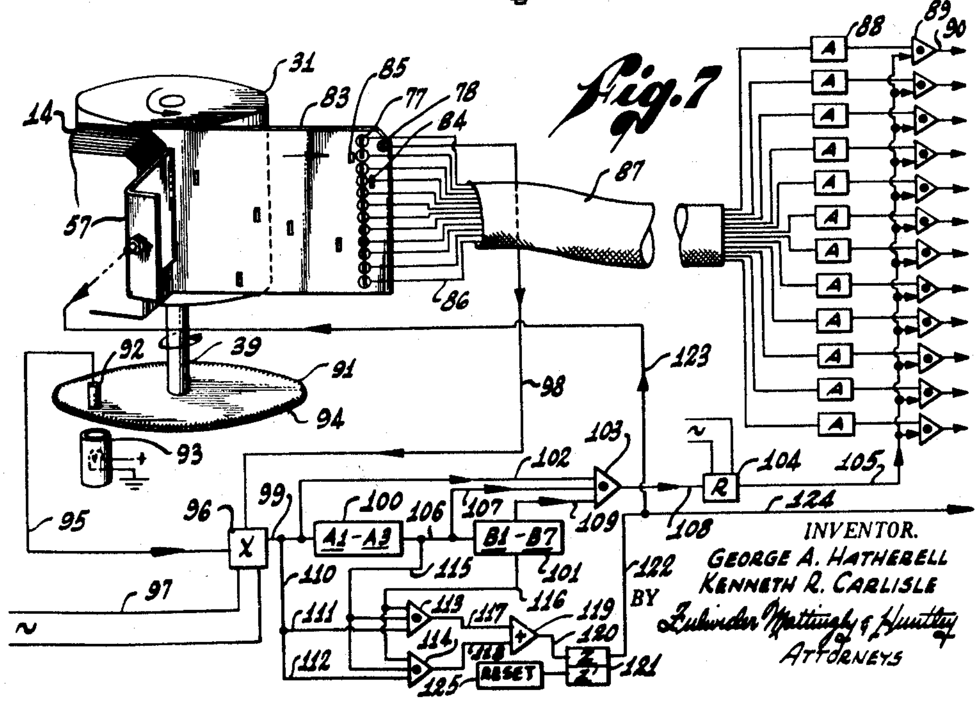
Figure 7 is a schematic diagram of the reading and timing system.

An "and" gate is indicated in the schematic diagram of Figure 7 by means of a dot centered triangle. The "and" gate is designed to deliver an output signal whenever a certain input signal configuration exists, the input signal configuration being defined by a logical "and" relation.

The logical "or" gate is indicated in the schematic diagram of Figure 7 by a triangle containing a plus sign, and operates in such a manner as to deliver an output signal whenever certain input signal configuration exist, the input signal configurations being defined by logical "or" relation. In the schematic diagram of Figure 7, the relationship between the mechanical parts of the card reader 10 and the electronic equipment housed in electronic chassis 28 may be understood by reference to the diagrammatic representation of the ingoing stack of cards 14, the feeding roll of 31, mounted on feeding roll shaft 39, and the photo-electric reading head 77, to the right of which is seen the monitor photocell 78. The card gate 57 is shown withdrawn just sufficiently to admit the passage of punched card 83, which is shown at the instant just after the reading photocells 77 have read the first column and are moving toward the second column. In the particular card 83, the first column is seen to have one hole punched in the fourth row at 84. An instant after the time indicated in Figure 7, the reading photocell 77 will detect a punched hole 85 in the second row of the second column.

The twelve photocells 77 are connected, by means of twelve lines 86 passing through conduit 87, to twelve amplifiers 88, in which any signal produced by any individual photocell is amplified for passage via one of the twelve output gates 89. As will be described in detail, gates 89 control the instant at which an output signal is permitted to pass toward the buffer register or computer or other data processing device to which the output of the reading head is being transmitted. Means for transmitting the output of the twelve gates 89 is indicated by the twelve lines 90.

In the specific embodiment of the invention which is diagrammatically illustrated in Figure 7, timing for all events in the card reading system is controlled by means of a timing disc 91 mounted on the shaft 39 to rotate with feed roll 31, and hence to provide a clock which is in synchronism with the speed at which the card 83 is passing the reading photocells 77 and the monitor photocell 78.

Timing impulses are produced in the form of signals from timer photocell 92 as it detects periodic flashes of light from timing photocell illumination 93, which are produced by a series of tiny notches 94 in the periphery of timing disc 91. In the particular device shown, there are about 500 evenly spaced notches a few thousandths of an inch wide and penetrate radially into timing disc 91 only a few thousandths of an inch.

Each clock pulse, indicated hereafter by the letter C, passes via timing line 95 to a monitor driver 96, deriving power through lines 97. Driver 96 is controlled by card monitor photocell 78, which is connected to driver 96 by line 98.

The monitor driver 96 produces in its output line 99 both clock pulses for counting and permission to read as long as monitor photocell 78 indicates the presence of a card. The card-present-clock pulses operate a pair of electronic counters, a reading counter 100 and a monitor counter 101. Both counters employ the usual sequence of flip-flops, and therefore operate on the basis of binary arithmetic. In the present example, it is desired to operate with five pulses between reading of successive columns in card 83, although it will be understood that reading could be spaced by almost any desired count of clock pulses, greater precision being achieved if necessary, by increasing the number of clock pulses between successive readings. Using a count of five as the basis for each successive reading, the binary arithmetic requires a succession of three flip-flops which may be indicated by the symbols A1, A2, and A3.

The monitor counter 101, assuming five counts between successive columns of holes in an IBM card, must allow 424 clock pulses for the proper passage of card 83. If the presence of a card is still indicated on the 425th count, then the monitor count must sound an alarm, since the cards are probably overlapping. On the other hand, the alarm must also be sounded if the clock count for the passage of a card is substantially less than 424 clock pulses, since there is an error in operation, probably resulting from a folded or torn card. In the present specific embodiment, monitor counter 101 is set to produce an alarm signal on the 420th count, if the card is indicated as no longer present, and on the 425th count, if a card is still indicated as present. Since monitor counter 101, like reading counter 100, operates on the basis of binary arithmetic, it requires seven flip-flops in order to count to 425 by fives.

In the present embodiment, the spacing between the monitor photocell 78 and the column of reading photocells 77 is adjusted by means of the adjustment 79 and 82, illustrated in Figures 5 and 6, so that reading photocell 77 are just in position to read the first column of the advancing card 83 at the same instant that monitor photocell 78 detects the presence of the card. Thus, as soon as an output pulse from driver 96 enters line 99 it also passes through line 102, to "and" gate 103, which, two other conditions being satisfied, passes the signal to reader driver 104. Reader driver 104 issues a periodic signal through line 105 to the reading output "and" gates 89 permitting them to pass a "read" signal, if any, to output lines 90. However, reader output driver 104 issues its permissive signal only on the count of 5, as signaled by reading counter 100 via lines 106, 107 and "and" gate 103, to which driver 104 is connected by line 108. Reader driver 104 also requires of its permissive signal that it receive a signal from monitor clock 101 via line 109, "and" gate 103, and line 108 that the time for reading, has not yet expired. In the present instance, reading takes place during the first 396 pulses across the card, and must be discontinued thereafter, for the remainder of the card passage time.

The instant the card-present-clock signal appears in line 99, as a result of a signal from monitor photocell 78 to driver 96, an impulse is transmitted via lines 110, 111, and 112 to a pair of "and" gates 113 and 114 in order to alert them for either too large or too small a clock pulse count during the time of a card passage. Gates 113 and 114 are connected to both reading counter 100, via line 115, and, monitor counter 101 via line 116 so that they may observe the counting process.

Gate 113 may be referred to as the overlapping card gate since it emits a signal through line 117, if, during the time that X signals that a card is present, the counter reaches a number as great as 425. Gate 114 may be referred to as the folded card alarm gate since it emits a signal if the count is 420 or less and the card-present signal discontinues. When the difficulty that has produced the alarm has been corrected, a reset button 125 may be pushed in order to turn alarm flip-flop 121 to an off position.

The circuits which control the operation of various devices, such as the flip-flops, drivers, gates, etc. as above described, are defined herein by certain logic equations. These equations are used in this specification to express not only the generic functional concepts involved, but also the actual circuit constructions. These equations utilize a form of algebra known as "Boolean algebra" which has been developed and is extensively used in the design and construction of digital computers. Boolean algebra is essentially an algebra consisting of only two admissive states which may be represented by the marks 0 and 1 or designated by any two conditions such as "on" and "off" or "true" and "false." A familiarity with the elements of Boolean algebra will greatly facilitate a complete understanding of the operation of the apparatus of this invention.

According to Boolean algebra as used herein (A, B, C, etc.) represent the "true" quantities in the logic equations, whereas such letters followed by a prime (A', B', C', etc.) represent the "false" quantities, being read "not A," "not B," etc.

All of the logic equations presented in this specification are variations and combinations of two basic relationships known respectively as the logical "or" and logical "and" combinations. The logical "or" relationship is typified by: $D=A+B'+C$, wherein the plus (+) sign is used to represent the "or" relationship. This equation means that D is true if A is true or if B is false or if C is true. The logical "and" relationship is typified by: $D=A(B'C)$, wherein the multiplications represented by the parentheses and the absence of any plus signs between the letters are used to represent the "and" relationship. This equation means that D is true only if A is true and B is false and C is true.

A logic equation may contain both "and" and "or" combinations, and the laws of ordinary algebra regarding the factoring and expansion of expressions holds true. For example, the equation: $D=A(B'+C)$ may be written: $D=AB'+AC$, and vice versa. In either form the equations means that D is true if A is true and B is false, or, if A is true and C is true.

Logic equations as above described are used herein to define the actual construction of the various circuits employed. As so used, the capital letters (A, B, C, etc.), alone or in combination with lower case letters or numerals (A*d*, B3, etc) are used to represent electrical signals produced on similarly designated output terminals of various devices similarly identified, underscoring being used to distinguish the device and its terminals from the signal. In the equipment herein described the signals so represented constitute, in most cases, a positive direct potential which is typically 15 volts. Thus "A" means that output terminal A is at +15 volts, whereas "B'" means that output terminal B' is at +15 volts. The various devices are given the same designating letter as the output terminal, so that "A" means the "true" output terminal of device A, and "B'" means the "false" output terminal of device B. Furthermore, since it is the control (function and apparatus) of the various circuit components that is defined by the logic equations, the equations most often relate to the device itself, rather than to its output signal. Thus, instead of writing (as above): $D=A+B'+C$, and "or" equation is herein written: $D=A+B'+C$, meaning that device D will be actuated to produce a +15 volt signal at its "true" output terminal, if such a signal obtains at the "true" output terminals of either of devices A or C or at the "false" output terminal of device B.

Applying the foregoing to the apparatus diagrammatically presented in Figure 7, the logic of the various parts and their relationship with one another may be laid down as follows:

Monitor driver 96:

$$X=X'PC$$
$$X'=XP'C$$

In these equations: X means the driver is on "true," in this case, "a card is present," P means a signal of card presence (i.e. no light) is being received from monitor photocell 78, C indicates a clock pulse. Here and subsequently the primed letters indicate a state of affairs opposite to that for unprimed letters.

Reader counter 100:

$$A1=A1'XC$$
$$A1'=A1C+X'C$$
$$A2=A2'A1C$$
$$A2'=A2A1C+X'C$$
$$A3=A3'A2A1C$$
$$A3'=A3C+X'C$$

In these equations A1 to A3 stand for the three flip-flops in reader counter 100, and produce an output every five counts at A1', A2' A3' X.

Reader driver 104:

$$R=A1'A2'A3'X(B7'+B5')$$

This equation indicates that reader driver 104, symbolized by R will operate "true," permitting a reading signal to be produced on output lines 90, whenever the conditions indicated prevail.

Monitor counter 101:

$$B1=B1'(XA1'A2'A3'C$$
$$B1'=B1(XA1'A2'A3'C)+X'C$$

$$Bn=Bn'B(N-1)B(N-2)\ \ldots\ B1A1'A2'A3'XC$$
$$Bn'=BnB(N-1)B(N-2)\ \ldots\ B1A1'A2'A3'XC+X'C$$

In these equations B1 to B7 stand for the seven flip-flops of monitor counter 101. Counter 101 produces an output at B7B5 (i.e. 400) over line 109 to stop the reading count passing through reader driver 104. Also, monitor counter 101 can produce a signal at B7B5B3B1 or at B7B5B3B1 which can join with an A3 signal from reading counter 100, and other signals to produce an alarm.

Alarm flip-flop 121:

$$Z=B7B5B3B1A3XC+B7B5B3A3X'C$$
$$Z'=SC$$

In these equations Z stands for flip-flop 121 in an alarm-sounding condition, and S stands for the reset switch.

The card reader described herein provides for reading punched cards and transmitting to data processing machines information at rates as high as 2,000 cards per minute, or about 20 times the rate which is currently standard practice with conventional card reading machines. Also, the card-reading device may be adapted to operate at any desired speed, even one card at a time if desired, by varying the speed at which motor 26 rotates and/or by means of solenoid gate 57. At maximum speed, solenoid gate 57 is held open all the time to permit a continuous flow of cards through the card reader 10. If desired, however, solenoid 58 may be operated to admit one card at a time with any frequency desired up to the card reader's maximum rate of about 2,000 cards per minute. Conventional means may be used for providing the actuating impulses to solenoid 58 at a desired frequency.

The objects and features of the invention are believed to have been fully and completely disclosed in the foregoing description of a specific embodiment, although it will be recognized that many changes may be made by those skilled in the art without departing from the invention. Consequently, this invention is not to be limited to the particular form, arrangement of parts, or sequence of operation herein described and shown, except as defined by the following claims.

We claim:

1. A card-handling means which includes a driving member having a frictional surface for engaging and moving a card; suction means for holding said card in engagement with the frictional surface including a stationary suction conduit extending to a point closely adjacent the plane of the moving card and having at least one suction orifice located in the region where the card engages the frictional surface and cooperating with the card, as the card moves past the orifice, to suck the card into engagement with the surface; and suction means for maintaining suction at said suction orifice.

2. In a device for conveying a series of cards in succession, a card handling system which includes: a conveyor means having an imperforate friction driving means for frictionally engaging a card and moving the card in the system; suction means having a conduit leading to a point adjacent the driving means but stationary relative thereto, said conduit having a stationary suction orifice located closely adjacent the path of movement of the card and in the region where the card engages the driving means to be moved thereby; and suction pump means for maintaining suction at said orifice.

3. A card handling means as described in claim 2, which includes a suction holder means for decelerating a moving card, said suction holder means being composed of a conduit leading to the plane in which said card moves and adapted to cause engagement between said card and a frictional braking surface.

4. A card handling means as described in claim 2 in which said moving surface is provided with longitudinal slots disposed in the direction of movement, and said suction holders extend into said slots, and, by means of suction orifices, cause said card to be engaged by portions of said moving surface.

5. In a device for conveying a series of cards in succession, a card handling system which includes: a cylindrical roll having at least one annular groove in its cylindrical surface and adapted over the remainder of its cylindrical surface to frictionally engage a card; a suction holder means comprising a conduit nesting in at least a part of said annular groove without interfering with the rotation of said roll, said conduit having a suction orifice disposed in a surface near that portion of the surface of said roll at which it is desired to engage said card; and suction pump means for producing suction at said suction orifice.

6. In a device for conveying a series of cards in succession, a card handling system which includes: a series of cylindrical driving rolls disposed along the path over which said cards are to be conveyed, each of said rolls being provided with at least one annular groove in its cylindrical surface; a suction holder means comprising a conduit nesting tangentially into at least a portion of said annular grooves, said conduit having a suction orifice disposed just within the card engaging surface of said roll; and vacuum pump means for producing suction at said suction orifices.

7. A card handling means for conveying a stream of cards end to end and controlling the velocity thereof, which means includes a series of imperforate rolls rotating about axes parallel to the plane of the cards moving in said card stream and spaced at less than a card length apart along the stream, said rolls having frictional driving surfaces to engage the cards and cause them to move in an end-to-end stream from roll to roll; and suction means including stationary conduits having suction orifices along the stream in the region of engagement of the cards with the rolls and cooperating with each card in succession for drawing the card into driving engagement with the rolls as the cards pass along the stream.

8. A card handling means as described in claim 7 which includes means for decelerating a card moving in said card stream, said means comprising a relatively stationary frictional surface having suction orifices located to bring said card into engagement with said surface in the region of desired deceleration.

9. A card handling means for passing a stream of cards end to end, from one stack to another, which includes: a feeding roll adapted to frictionally engage one card at a time from a stack of incoming cards, the cylindrical card engaging surface of said roll being formed with a plurality of alternate annular grooves and ridges; a plurality of suction holders for holding said card in engagement with the ridges of said roll while the card is fed thereby, each of said suction holders comprising a suction conduit supported in a nesting position in one of said annular grooves and provided with a suction orifice located at the card engaging region of said feeding roll; at least one passing roll located downstream from said feeding roll, the cylindrical card engaging surface of said roll being formed with a plurality of alternate annular grooves and ridges; a plurality of suction holders for holding said card in engagement with the ridges of said passing roll while the card is fed thereby, each of said suction holders comprising a suction conduit supported in a nesting position in one of said annular grooves and provided with a suction orifice located at the card engaging region of said passing roll; a stacking roll at the terminus of said card stream, the cylindrical card engaging surface of said stacking roll being formed with a plurality of alternating annular grooves and ridges; a plurality of suction holders for holding said card stream into engagement with the ridges of said passing roll while the card is fed thereby, each of said suction holders being composed of a suction conduit supported to nest in one of said annular grooves with a suction orifice located at the card engaging region of said stacking roll; and a suction decelerator downstream from said stacking roll, said suction decelerator being composed of a frictional surface stationary relative said moving card stream and having a suction orifice for bringing each card into braking engagement with said frictional surface.

10. A photoelectric card reader for reading a series of punched cards and transmitting information therefrom in the form of electric pulses, which reader includes: a feeding roll adapted to frictionally engage one card at a time from a stack of incoming cards, the cylindrical card engaging surface of said roll being formed with a plurality of alternate annular grooves and ridges; a plurality of suction holders for holding said card in engagement with the ridges of said roll while the card is fed thereby, each of said suction holders being composed of a suction conduit supported in a nesting position in one of said annular grooves and provided with a suction orifice located at the card engaging region of said feeding roll; a reading head located on one side of the stream of cards coming from said feeding roll, said reading head being provided with a plurality of reading photocells disposed transversely to said card stream, one reading photocell for each row of information locations on said card; a monitor photocell located downstream from said reading photocells; an illumination means on the opposite side of said card stream and adapted to excite said photocells; masking means between said card stream and said illumination means to control the area of illumination projected on said photocells; a passing roll located downstream from said reading head and less than one card length downstream from said feeding roll, the cylindrical card engaging surface of said roll being formed with a plurality of alternate annular grooves and ridges; a plurality of suction holders for holding said card in engagement with the ridges of said passing roll while the card is fed thereby, each of said suction holders being composed of a suction conduit supported in a nesting position in one of said annular grooves and provided with a suction orifice located at the card engaging region of said passing roll; a stacking roll downstream from said passing roll, but on the opposite side of said card stream from said feeding and passing rolls, the cylindrical card engaging surface of said stacking roll being formed with a plurality of alternating annular grooves and ridges; a plurality of suction holders for holding said card stream into engagement with the ridges of said passing roll while the card is fed thereby, each of said suction holders comprising a suction conduit supported to nest in one of said annular grooves with a suction orifice located at the card engaging region of said slacking roll; a timing means adapted to emit clock pulses at a rate corresponding to the velocity of said card stream; and counter means governed by said clock pulses for timing the intervals of transmission of read signals from said reading photocells.

11. A photoelectric card reader which includes: a series of cylindrical driving rolls disposed along the path over which said cards are to be conveyed, each of said rolls being provided with at least one annular groove in its cylindrical surface; suction holder means composed of a conduit nesting tangentially into at least a portion of said annular grooves, said conduit having a suction orifice disposed just within the card engaging surface of said roll; vacuum pump means for producing suction at said suction orifices; a row of reading photocells disposed transversely to the stream of cards conveyed by said rolls; a monitor photocell near said reading photocells; a timing means adapted to emit clock pulses at a rate corresponding to the velocity of said card stream; a control driver adapted to receive clock pulses from said timing means; a read timing counter adapted to time reading signals to the output of said reading photocells at intervals corresponding to the longitudinal distance traveled by said card between successive columns of information locations therein, said read timing counter being driven by said control driver; a monitor counter driven by said read timing counter adapted to maintain a count on the number of pulses required for the passage of said card in its movement across said monitor photocell; a reader driver receiving signals from said control driver and initiating a command signal permitting reading of the first column of said card upon said signal, said reader driver thereafter repeating said command upon receiving a signal of periodic read timing count from said read timing counter, until ordered to discontinue reading by a maximum count signal received from said monitor counter; an "and" gate adapted to produce an output signal whenever it simultaneously receives an input signal from said control driver that a card is in the process of passage, and an input signal from said monitor counter that the count predetermined for card passage has been exceeded; an "and" gate adapted to produce an output signal whenever an input signal is received from said control driver that a card has completed passage past said monitor photocell, and that the count at said monitor counter is less than a predetermined minimum; an "or" gate for receiving impulses from both of said "and" gates, and for producing an output impulse in case of an input pulse from either one; and an alarm device operating in response to an output from said "or" gate.

12. A photoelectric card reader for passing a stream of cards, one at a time, past a reading head, and for reading said cards and transmitting information therefrom in the form of electric pulses, which reader includes: a feeding roll adapted to frictionally engage one card at time from a stack of incoming cards, the cylindrical card engaging surface of said roll being formed with a plurality of alternate annular grooves and ridges; a plurality of suction holders for holding said card in engagement with the ridges of said roll while the card is fed thereby, each of said suction holders being composed of a suction conduit supported in a nesting position in one of said annular grooves and provided with a suction orifice located at the card engaging region of said feeding roll; a reciprocating card gate for admitting one card at a time to be fed by said feeding roll; solenoid means for operating said card gate; a variable frequency oscillator for exciting said solenoid to drive said card gate at a desired card feeding rate; a reading head located on one side of the stream of cards coming from said feeding roll, said reading head being provided with a plurality of reading photocells disposed transversely to said card stream, one reading photocell for each row of information locations on said card; a monitor photocell located downstream from said reading photocells; an illumination means located on the opposite side of said card stream and adapted to excite said photocells; masking means between said card stream and said illumination means to control the area of illumination projected toward said photocells; a passing roll located downstream from said reading head and less than one card length downstream from said feeding roll, the cylindrical card engaging surface of said roll being formed with a plurality of alternate annular grooves and ridges; a plurality of suction holders for holding said card in engagement with the ridges of said passing roll while the card is fed thereby, each of said suction holders comprising a suction conduit supported in a nesting position in one of said annular grooves and provided with a suction orifice located at the card engaging region of said passing roll; a stacking roll downstream from said passing roll, but on the opposite side of said card stream from said feeding and passing rolls, the cylindrical card engaging surface of said stacking roll being formed with a plurality of alternate annular grooves and ridges; a plurality of suction holders for holding said card stream into engagement with the ridges of said passing roll while the card is fed thereby, and for decelerating said card stream at the point of stacking into an outgoing card stack, each of said suction holders comprising a suction conduit supported to nest in one of said annular grooves, with suction orifices located near the region at which it is desired to engage said cards; a timing means synchronous with said feeding roll and adapted to emit clock pulses during the flow of said card stream; a control driver adapted to receive clock pulses from said timing means, said control driver means being activated into an "on" position by a signal from said monitor photocell indicating the presence of the card interrupting illumination to said photocell; a counter means controlled by clock pulses from said control driver; and means for transmitting readings from said reading photocells at appropriate intervals in response to signals from said counter means.

13. A photoelectric card reader for passing a stream of cards, one at a time, past a reading head and for reading said cards and transmitting information therefrom in the form of electric pulses, which reader includes: a feeding roll adapted to frictionally engage one card at a time from a stack of incoming cards, the cylindrical card engaging surface of said roll being formed with a plurality of alternate annular grooves and ridges; a plurality of suction holders for holding said card in engagement with the ridges of said roll while the card is fed thereby, each of said suction holders comprising a suction conduit supported in a nesting position in one of said annular grooves and provided with a suction orifice located at the card engaging region of said feeding roll; a reciprocating card gate for admitting one card at a time to be fed by said feeding roll; solenoid means for operating said card gate; a variable frequency oscillator for exciting said solenoid to drive said card gate at a desired card feeding rate; a reading head located on one side of the stream of cards coming from said feeding roll, said reading head being provided with a plurality of reading photocells disposed transversely to said card stream, one reading photocell for each row of information locations on said card; a monitor photocell located downstream from said reading photocells;

means for adjusting the spacing between said monitor photocell and adjacent reading photocells; illumination means located on the opposite side of said card stream and adapted to excite said photocells; masking means between said card stream and said illumination means to control the area of illumination projected on said photocells; a passing roll located downstream from said reading head and less than one card length downstream from said feeding roll, the cylindrical card engaging surface of said roll being formed with a plurality of alternate annular grooves and ridges; a plurality of suction holders for holding said card in engagement with the ridges of said passing roll while the card is fed thereby, each of said suction holders being composed of a suction conduit supported in a nesting position in one of said annular grooves and provided with a suction orifice located at the card engaging region of said passing roll; a stacking roll downstream from said passing roll, but on the opposite side of said card stream from said feeding and passing rolls, the cylindrical card engaging surface of said stacking roll being formed with a plurality of alternate annular grooves and ridges; a plurality of suction holders for holding said card stream into engagement with the ridges of said passing roll while the card is fed thereby, each of said suction holders being composed of a suction conduit supported to nest in one of said annular grooves, with a suction orifice located at the card engaging region of said stacking roll; a plurality of suction decelerator means for decelerating said card stream near the point of outgoing card stacking, each of said suction decelerators being composed of suction conduit and orifice means adapted to frictionally engage said card stream with a relatively stationary surface; a timing disc mounted on the same shaft as said feeding roll, said timing disc being notched at its periphery with a plurality of evenly spaced radial notches adapted to admit light from one side of said disc to the other; an illumination means located on one side of said disc; a timing photoelectric cell located on the opposite side of the disc adjacent said notches and adapted to detect light intermittently passed by said notches as said timing disc rotates with said feed roll; a control driver adapted to receive clock pulses from said timing photoelectric cell, said control driver being activated into an "on" position by a signal from said monitor photocell indicating the presence of a card at reading location; a read timing counter composed of a plurality of flip-flops deployed in a counting circuit adapted to repeat count after a number of clock pulses corresponding to the longitudinal distance traveled by said card between successive columns of information locations thereon, said read timing counter being driven by said driver; a monitor counter driven by said read timing counter and adapted to maintain a count on the number of pulses required for the passage of said card in its movement across said monitor photocell; a reader driver receiving signals from said control driver and initiating a command signal permitting reading of the first column on said card upon said signal, said reader driver thereafter repeating said command upon receiving a signal of a periodic read timing count from said read timing counter, until ordered to discontinue reading by a maximum count signal received from said monitor counter; an "and" gate adapted to produce an output signal whenever it simultaneously receives an input signal from said control driver that a card is in the process of passage, and an input signal from said monitor counter that the count predetermined for card passage has been exceeded; an "and" gate adapted to produce an output signal whenever an input signal is received from said control driver that a card has completed passage past said monitor photocell, and that the count at said monitor counter is less than a predetermined minimum; an "or" gate for receiving impulses from both of said "and" gates, and for producing an output impulse in case of an input pulse from either one; and an alarm device operating in response to an output from said "or" gate.

References Cited in the file of this patent

UNITED STATES PATENTS

| | | |
|---|---|---|
| 2,184,229 | Spiess | Dec. 19, 1939 |
| 2,819,076 | Wendt et al. | Jan. 7, 1958 |